United States Patent
Boss et al.

(10) Patent No.: US 7,953,887 B2
(45) Date of Patent: May 31, 2011

(54) ASYNCHRONOUS AUTOMATED ROUTING OF USER TO OPTIMAL HOST

(75) Inventors: Gregory J. Boss, American Fork, UT (US); Rick A. Hamilton, II, Charlottesville, VA (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/031,200

(22) Filed: Feb. 14, 2008

(65) Prior Publication Data

US 2009/0210513 A1 Aug. 20, 2009

(51) Int. Cl.
*G06F 15/173* (2006.01)
(52) U.S. Cl. ........ 709/238; 709/217; 709/218; 709/219; 709/223; 709/224; 709/225
(58) Field of Classification Search .......... 709/217–219, 709/238, 223–225
See application file for complete search history.

(56) References Cited

U.S. PATENT DOCUMENTS

| | | | |
|---|---|---|---|
| 6,606,643 B1 * | 8/2003 | Emens et al. | 709/203 |
| 7,457,877 B1 * | 11/2008 | Shah et al. | 709/226 |
| 7,568,032 B2 * | 7/2009 | Feng et al. | 709/226 |
| 2002/0184363 A1 * | 12/2002 | Viavant et al. | 709/224 |
| 2003/0217147 A1 * | 11/2003 | Maynard et al. | 709/225 |
| 2007/0088862 A1 | 4/2007 | Burkman et al. | |
| 2007/0208751 A1 * | 9/2007 | Cowan et al. | 707/10 |
| 2007/0282874 A1 * | 12/2007 | Metcalfe | 707/101 |
| 2009/0055537 A1 * | 2/2009 | Takei et al. | 709/227 |

OTHER PUBLICATIONS

Huang, Y. et al., "Network mapping for dynamic selection of web services: promises and challenges", Published online: Jul. 26, 2005, © Springer-Verlag 2005, pp. 282-297.

* cited by examiner

*Primary Examiner* — Duyen M Doan
(74) *Attorney, Agent, or Firm* — William E. Schiesser; Roberts Mlotkowski Safran & Cole, P.C.

(57) ABSTRACT

A system and method of automatically routing a user to an optimal data center of a host. A method includes transmitting a web page having measurement code and modification code from one of a plurality of data centers to a computing device. The measurement code determines an optimal data center of the plurality of data centers for the computing device, and the modification code alters at least one link in the web page to point to the optimal data center.

23 Claims, 5 Drawing Sheets

ASYNCHRONOUS AUTOMATED ROUTING OF USER TO OPTIMAL HOST

FIELD OF THE INVENTION

The invention generally relates to web hosting and, more particularly, to systems and methods for routing users to an optimal host.

BACKGROUND OF THE INVENTION

Web hosting centers often employ a multi-site architecture to mitigate failure and decrease end user response time. For example, a web hosting center may have multiple redundant data centers located at different physical locations. When a user visits a web site, the web server routes the user to one of the data centers, and the user receives the requested data from the data center. The use of multiple redundant data centers provides the web host with security against failure. That is, when a particular data center is rendered unavailable (for example, by mechanical failure, high traffic, etc.), the data is still available from another data center such that routine business may continue.

There currently exist several methods for routing users to different data centers. A first method is the use of round robin domain name system (DNS). In this method, a DNS server maintains or obtains a list of all of the possible data centers for a web site. When a user visits the web site, they are directed to the next data center on the list. For example, a first user that visits the web site is routed to the first data center on the list, a second user that visits the web site is routed to the second data center on the list, and so on. When the end of the list is reached, the next user is routed to the first data center on the list, and the process starts over. In this manner, users visiting the web site are substantially randomly distributed amongst the data centers. The round robin DNS methodology is disadvantageous in that it blindly routes a user to a data center without taking into account any performance concerns of the user or the availability of the data center.

Another known method for routing users amongst multiple data centers is Global Server Load Balancing (GSLB), which is a form of DNS-based load balancing. When a user requests the IP address from a GSLB-enabled site, they are routed to a particular data center based upon parameters such as, for example: the availability of back end servers, the round trip time for packets from GSLB hardware to back end servers, etc. The GSLB method is disadvantageous in that it requires additional hardware and does not take into account parameters that are specific to the user accessing the web site.

A third method of routing a user to one of multiple data centers is to allow a user to select which data center to be routed to. For example, when a user visits a web site, the user may be presented with a list of data centers and the geographic location of each data center. The user is prompted to choose a data center from the list, and often chooses the data center in closest geographical proximity to the user's location. However, this method is disadvantageous in that it requires the user to choose the data center, thereby increasing the user workload. Moreover, the data center with the closest physical location to the user may not be the data center with the fastest connection for the user.

Accordingly, there exists a need in the art to overcome the deficiencies and limitations described hereinabove.

SUMMARY OF THE INVENTION

In a first aspect of the invention, there is a method comprising transmitting a web page having measurement code and modification code from one of a plurality of data centers to a computing device. The measurement code determines an optimal data center of the plurality of data centers for the computing device, and the modification code alters at least one link in the web page to point to the optimal data center. The method may further include creating and storing the web page.

In another aspect of the invention, there is a method of routing a user to an optimal data center. The method comprises providing a computer infrastructure operable to: store copies of a web page having embedded measurement code and modification code at a plurality of data centers of a host; and transmit the web page to a computing device. The measurement code determines for the computing device an optimal data center of the plurality of data centers, and the modification code alters at least one link of the web page to constrain future downloads by the computing device from the host to occur from the optimal data center.

In another aspect of the invention, there is a computer program product comprising a computer usable medium having a computer readable program embodied in the medium, wherein the computer readable program when executed on a computing device is operable to cause the computing device to transmit a web page containing embedded measurement code and modification code from a data center of a plurality of data centers to a computing device across a network. The measurement code, upon completion of downloading of the web page at the computing device, determines for the computing device an optimal data center of the plurality of data centers. The modification code alters at least one link of the web page to point to the optimal data center such that data associated with selecting the at least one link is downloaded from the optimal data center.

In another aspect of the invention, there is a system comprising a host including a plurality of data centers, each data center of the plurality of data centers storing a copy of a web page and being connected to a network that is accessible by a computing device, the web page comprising embedded network speed measurement code and link modification code. At least one of a hardware and software component is configured to transmit the web page from one data center of the plurality of data centers to the computing device. The measurement code, upon completion of downloading of the web page at the computing device, determines for the computing device an optimal data center of the plurality of data centers. The modification code alters at least one link of the web page to point to the optimal data center such that data associated with selecting the at least one link is constrained to be downloaded from the optimal data center.

DETAILED DESCRIPTION OF EMBODIMENTS OF THE INVENTION

The invention generally relates to web hosting and, more particularly, to systems and methods for automatically routing users to an optimal host. In implementations of the invention, asynchronous speed measurement and link alteration code is embedded into a web page. When a user downloads the web page, the speed measurement code tests data transfer speeds between the user and a plurality of available data centers. Once an optimal data center is determined, the link alteration code alters certain links of the web page to point to the optimal data center. In this manner, the user may be directed to the fastest data center for the user, while the need for expensive load-balancing hardware is eliminated.

Figure 1:
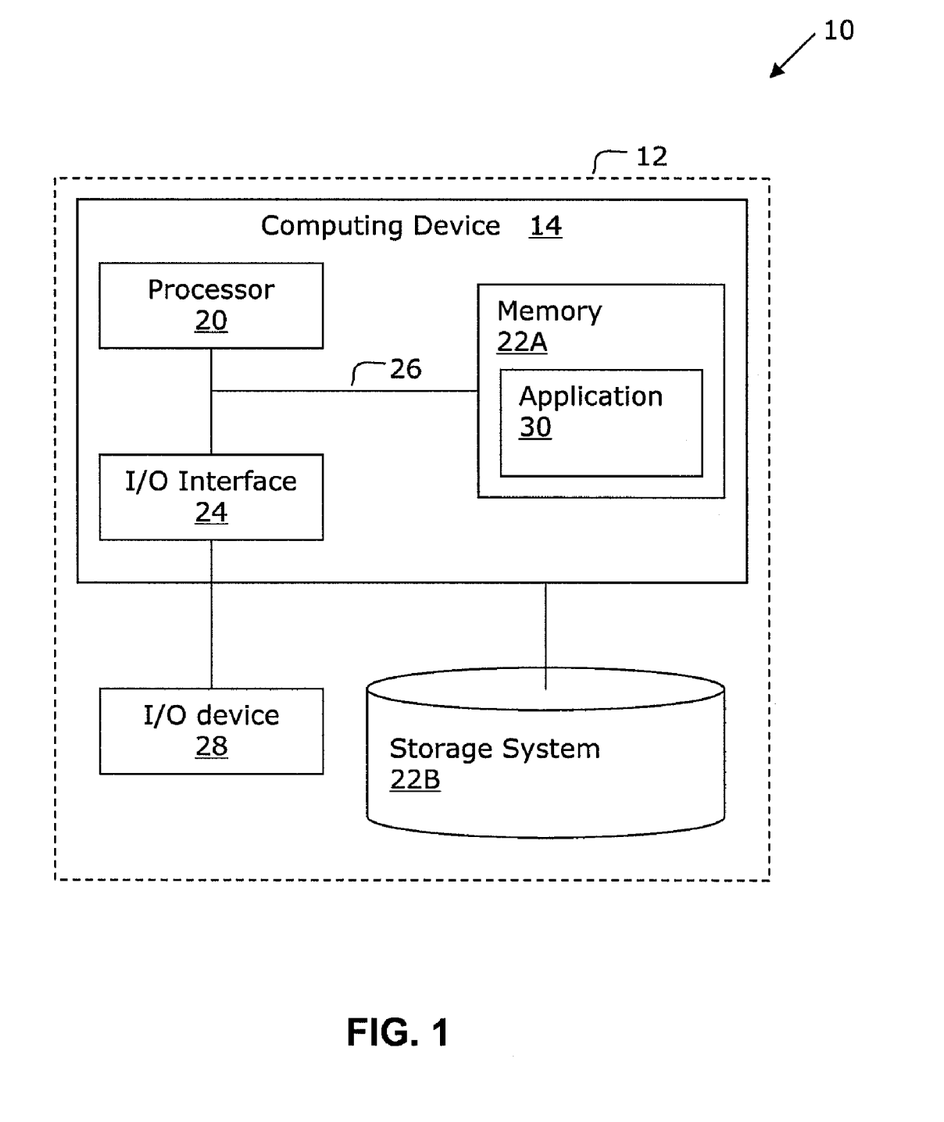
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, for example, automatically routing a user to an optimal host. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or providing entity, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
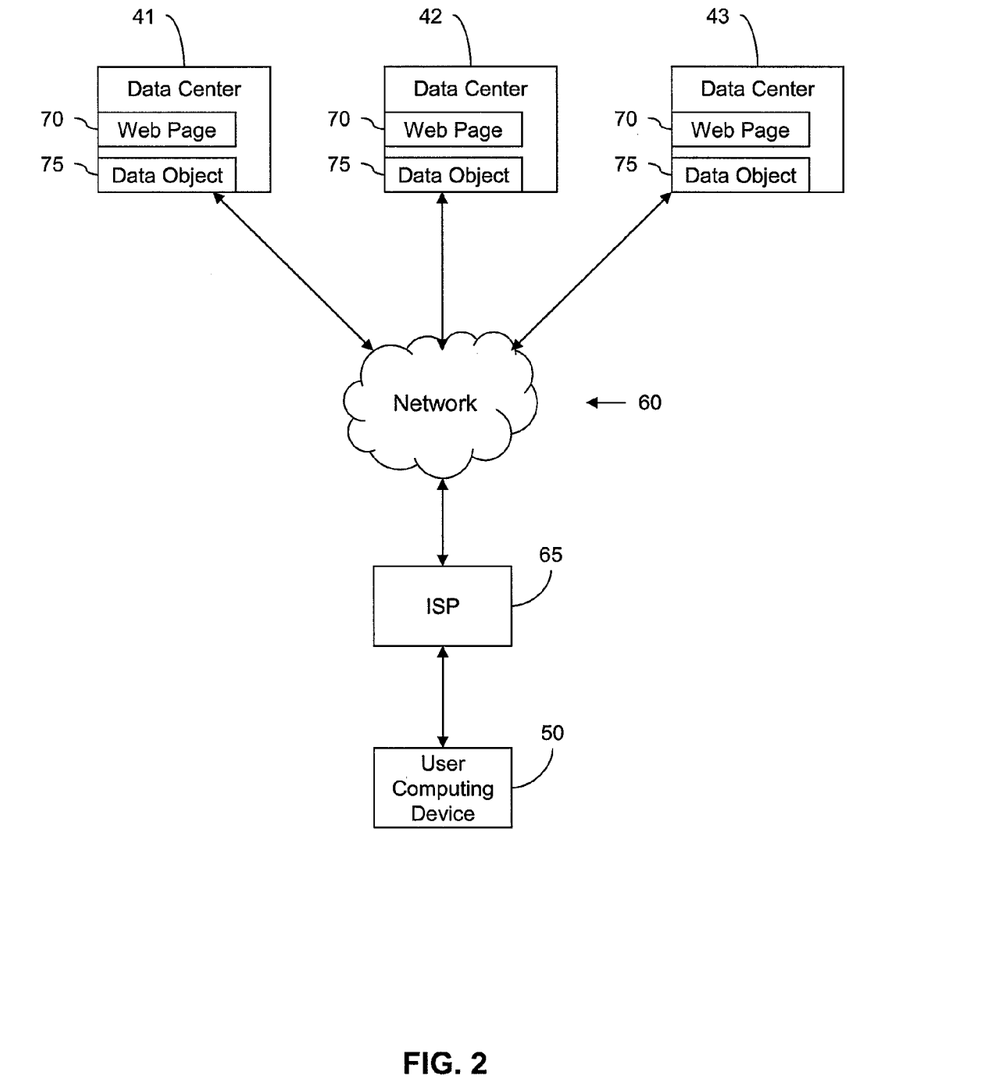
FIG. 2 shows a system according to aspects of the invention.

FIG. 2 shows a system according to aspects of the invention. The system comprises a first data center 41, second data center 42, and third data center 43 of a host. The data centers 41, 42, 43 represent redundant data centers that physically store at least some substantially identical data, such as, for example, web site content. The data may be stored in any suitable manner, such as, for example, in servers and/or databases, including storage systems 22B described in FIG. 1. The data centers may be located at different geographic locations, such as, for example, in different cities. Although three data centers are shown, any number of data centers may be used within the scope of the invention.

Also shown in FIG. 2 is a user computing device 50, which may comprise an article of computing such as that described above with respect to FIG. 1. For example, the user computing device 50 may be embodied as a personal computer, notebook computer, smartphone, etc. In embodiments, the user computing device 50 is provided with a browser, or other suitable software and/or hardware, that allows the user computing device 50 to communicate via a network, such as the Internet 60. For example, the user computing device 50 may be connected to an internet service provider (ISP) 65 that is, in turn, connected to the Internet 60. In this way, the user computing device 50 can communicate data to, and download data from, other articles of computing connected to the Internet 60, such as the data centers 41, 42, 43.

Each data center 41, 42, 43 physically stores at least some substantially identical data that, in embodiments, includes the content of a web page 70. For example, the data may include content that may be transferred across the Internet 60 to the user computing device 50 and displayed via the browser as words, images, sounds, links to other web pages, etc. The data may also include dummy objects 75 that are used to test network connection speeds, as described in further detail below.

According to aspects of the invention, the web page 70 contains measurement and alteration code that allow the user computing device 50 to determine the optimal data center 41, 42, 43 to download data from. In embodiments, the measurement and alteration code comprises asynchronous code embedded in the web page 70, such as, for example, Asynchronous JavaScript® and XML (AJAX) code. (JavaScript® is a registered trademark of Sun Microsystems, Inc. in the United States and/or throughout the world.) However, the invention is not limited to AJAX code, and any suitable programming language that can be embedded into a webpage and perform the processes described herein may be used with the invention.

Network Speed Measurement

In embodiments, the measurement code that is embedded into the web page 70 comprises AJAX code that measures network speed between the user computing device 50 and each of the data centers 41, 42, 43. The measurement code contains, or is capable of obtaining, the identities (e.g., hostnames or IP addresses) of the data centers 41, 42, 43 that data is available from. After the user computing device 50 has completed downloading the web page 70, the measurement code asynchronously requests download of a dummy object 75 from each respective data center 41, 42, 43, and measures the time to receive the dummy object from each respective data center 41, 42, 43 to the user computing device 50. This may be accomplished, for example, by starting a timer, sending a request to a data center for the dummy object, and stopping the timer when the dummy object is received at the user computing device 50 or a timeout occurs. By comparing the download time of an identical dummy object from each data center, the measurement code determines the optimal (e.g., fastest) data center for the particular user computing device 50.

In implementations, the dummy object 75 comprises any suitable data object that is stored at the data centers 41, 42, 43, and downloadable to the user computing device 50. For example, the dummy object 75 may comprise a JavaScript® object, although the invention is not limited to the use of JavaScript® dummy objects. Furthermore, the dummy object 75 may be of any desired size (e.g., 1 kB, 1 MB, etc.). Even further, the dummy object 75 may comprise a plurality of dummy objects of the same or varying size. For example, the dummy object 75 may comprise six 1 kB objects and one 2 MB object. By utilizing multiple dummy objects of different sizes, the measurement code is able to determine which data center is fastest for downloading small files, and which data center is fastest for downloading large files. Even further, the dummy object 75 may include non-test data to be stored in the cache of the user computing device 50 for faster subsequent web page loads, such as a graphic file that may be required if the user clicks at least one of the links on the web page.

When multiple different size dummy objects are stored at the data centers, click through anticipation may be used to determine which size dummy object to base the comparison of data centers on. In embodiments, predefined rules are included in the measurement code that signify an assumption that the user computing device 50 intends to download a certain type of file (e.g., a very large file). For example, if the user computing device 50 is visiting a driver download web page, the rule set signifies that the user intends to download large files. In such a situation, the network speed measurement is performed with large dummy objects instead of small dummy objects, since large dummy objects will more closely mimic the anticipated action of the user. The predefined rules may be based upon any suitable parameters, such as, for example, the type of web page (e.g., a driver download page), the path that a user took to get to the web page (e.g., available from information from a search engine), the calculated file sizes of links on the web page (e.g., web page or object downloads), etc.

In embodiments, the network speed measurement is performed when the user computing device 50 has completed downloading the web page 70. Additionally or alternatively, the network speed measurement may be performed at regular time intervals to ensure that the user computing device 50 is always using the optimal data center. For example, the network speed measurement may be performed once every ten minutes, although any suitable time interval may be used with the invention. As another example, the download speed of the user computing device 50 from the data center may be monitored, and a network speed measurement performed when the download speed degrades below a predefined threshold. As subsequent network speed measurements determine the same or a different optimal data center, the links of the web page are modified, as described below, according to the most recently determined optimal data center.

Link Modification

Once the optimal data center for the user computing device 50 is determined via the measurement code, the alteration code modifies at least one link on the web page 70 to point toward the optimal data center. In embodiments, the alteration code comprises AJAX code embedded into the web page 70 that modifies all of the links contained in web page 70 that use the same hostname. For example, a table internal to the JavaScript® may contain a mapping of page element IDs to relative URLs. With the mappings stored in a table, the JavaScript® can iterate over all links and modify the HTML to point to the selected data center. This may be accomplished using "<span>" tags in conjunction with an "innerHTML" accessory to modify the contents inside the span tag, as is understood by those having ordinary skill in the art such that further explanation is not necessary.

After the links of web page 70 have initially been altered by the alteration code and the user follows one of the links to a new web page of the same host, subsequent relative links on other pages will not need to be modified due to the fact that such relative links point toward the same data center as the current web page. However, non-relative links (also called static links or fully qualified links) should be modified since fully qualified links do not automatically point toward the same data center as the current web page. In this case, the alteration code identifies and modifies the fully qualified links of the new web page in a manner similar to that described above. In this manner, as long as the user computing device 50 visits web sites hosted by the same host, the user computing device 50 will be connected to the optimal data center of that host, which was determined via the measurement code. In this manner, links on a web page may be determined via the measurement code to point to different data centers within the same web page (e.g., some links to large download objects may be modified to point toward a different data center than one that provides better results for smaller download objects). If the user visits a web site hosted by a different host, the network speed measurement and link alteration may be performed for the data centers of the new host.

Performance Metrics

In further embodiments of the invention, performance metrics determined by other users may be used in lieu of performing the network speed measurement. Because performing the network speed measurement requires an expenditure of computing time and resources, it may be beneficial for a later user to use the same data center that has already been determined as optimal for a similarly situated user. In this way, the later user can benefit from using an optimal data center without having to expend resources to perform the network speed measurement.

Figure 3:
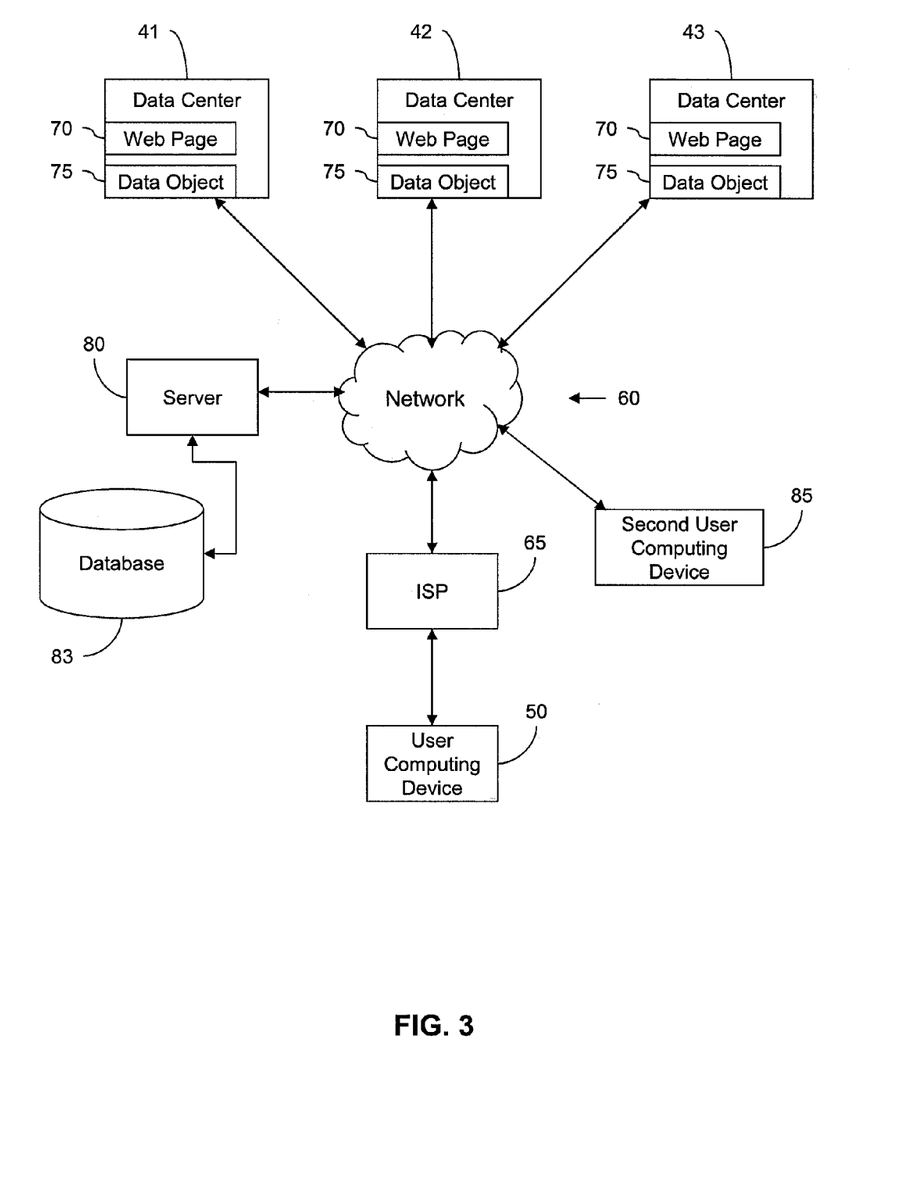
FIG. 3 shows an alternative system according to aspects of the invention.

For example, as shown in FIG. 3, a system may include the data centers 41, 42, 43 and user computing device 50 as described with respect to FIG. 2. The system of FIG. 3 additionally includes a metrics server 80. When the user computing device 50 performs a network speed measurement determination to determine an optimal data center, performance metrics regarding the user computing device 50 are stored by the metrics server 80 in a performance database 83. In implementations, the performance metrics include any information that is known or may be inferred about the network location of the user computing device 50. For example, the performance metrics may include the user computing device 50 IP address, the ISP associated with the user computing device 50, the identity of the nearest gateways associated with the user computing device 50, etc. The performance metrics also include the identity of any optimal data centers determined by the user computing device 50.

FIG. 3 shows a second user computing device 85, which may be similar to the user computing device 50 and may connect to the network 60 via an ISP (not shown). When the second user computing device 85 downloads the web page 70, but before the commencement of network speed measurements, a component of the measurement code queries the metrics server 80 for past performance data regarding similarly situated users. In embodiments, the metrics server 80 compares the network location information associated with second user computing device 85 to that of other users stored in the performance database 83. The comparisons are based upon predetermined routines that are accessible by the metrics server 80, which routines may be designed and modified as applicable for the intended use of the system. If the metrics server 80 determines that the second user computing device 85 is similarly situated to the first user computing device 50, then the metrics server 80 communicates the identity of the optimal data center to the second user computing device 85. If, however, the metrics server 80 determines that the second user computing device 85 is not similarly situated to any previous user data in the performance database 83, then the metrics server 80 informs the second user computing device 85 that perform network speed measurement tests need to be performed. Accordingly, the measurement code and alteration code operate to determine an optimal data center for the second user, similar to that already described herein.

Once the identity of the optimal data center for host of the web page 70 is determined, either via the metrics server 80 or network speed measurement, the alteration code modifies links on the web page 70 to direct the second user computing device 85 to the optimal data center for subsequent links to this host.

The invention is not limited to geographic (e.g., network location, physical location) metrics, as described above. For example, in a similar manner, chronological affinities may be established, given that certain websites and their associated data centers may experience different peak and nadir traffic patterns through the course of a day, week, or month, etc. Data regarding such temporal performance of data centers may be stored in the performance database 83, such that when a user downloads a web page, the metrics server 80 may identify an optimal data center for the user based upon the temporal performance data. In this manner, the metrics server 80 may operate to direct users away from data centers that historically experience high traffic at certain times. Also, a combination of geographic metrics and temporal metrics may be used with implementations of the invention.

Processes of the Invention

The steps of the flow diagrams described herein may be implemented in the environment of FIG. 1, as well as in the environments of FIGS. 2 and/or 3. The flow diagrams may equally represent a high-level block diagram of the invention. The steps of the flow diagrams may be implemented and executed from a server, in a client-server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
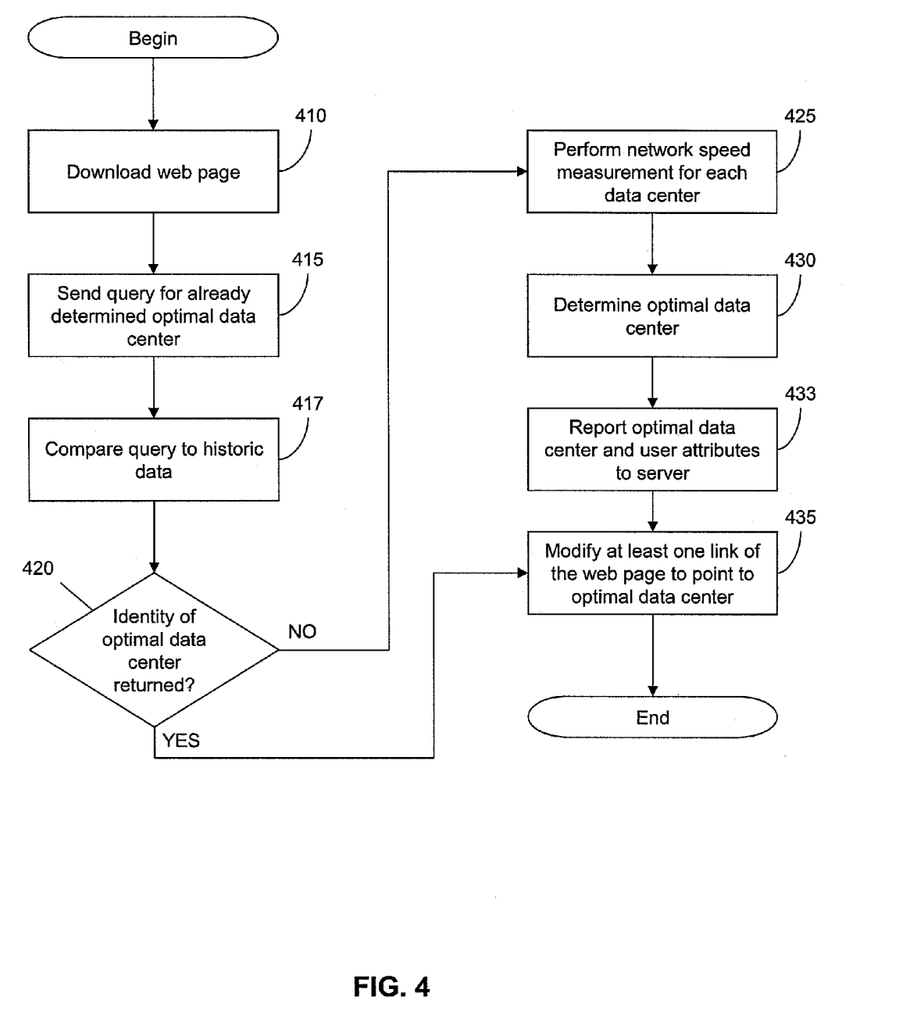
FIGS. 4 and 5 show flow diagrams depicting implementations of methods according to aspects of the invention.

FIG. 4 shows a flow diagram depicting steps of a first method for automatically routing a user to an optimal data center according to aspects of the invention. At step 410, a web page is initially downloaded. This may be accomplished, for example, by the user accessing the web page via a browser. The web page is stored at a plurality of data centers of a host, and the web page is downloaded in step 410 from any one of the data centers. The web page includes embedded measurement code and modification code as previously described.

At step 415, a query is sent for the identity of an already determined optimal data center. In embodiments, the AJAX code causes the user computing device to transmit the query to a server, such as, for example, the metrics server described above with respect to FIG. 3. The query may include, for example, attributes pertaining to the user computing device (e.g., IP address, geographic location, etc.) and attributes pertaining to the host (e.g., host name, IP address, data centers, etc.).

At step 417, the attributes of the query are compared to the historic data stored in a database. This may be accomplished, for example, with a metrics server and performance database as described above with respect to FIG. 3. The server applies pre-defined routines to determine if an optimal server for this particular host has previously been determined for a similarly situated user computing device. In embodiments, the pre-defined routines compare at least one of the geographic and network proximity of the computing device to that of computing devices stored in the database.

For example, the historical data may show that an optimal data center of this host was previously determined by a computing device that is geographically located half a kilometer from the user computing device. The server routine may include a rule that any geographic proximity less than one kilometer qualifies as similarly situated. In this case, the server would determine that the previous computing device and the current user computing device are similarly situated, and would return the previously determined identity of the optimal data center for this host to the user computing device. Although a geographic proximity of one kilometer has been described, the invention is not limited to this example. For example, a geographic proximity of any suitable distance could be used with the invention. Additionally or alternatively, any suitable network proximity (e.g., network distance to a gateway) could be used with the invention. Moreover, the previous computing device and the current user computing device may be the same (i.e., a computing device may use results that it previously determined).

At step 420, it is determined whether the server returned an identity of an optimal data center. In embodiments, this is performed by the AJAX code embedded in the web page. If an identity of an optimal data center is returned, then the process proceeds to step 435, described in greater detail below. If an identity of an optimal data center is not returned, then the process proceeds to step 425.

At step 425, a network speed measurement for each data center of the host is performed. In embodiments, this is accomplished by the AJAX code, which operates to start a timer, send a request to a data center for downloading a dummy object, and measure the amount of time until the dummy object is received from the data center (or until a timeout occurs). This is repeated for each data center.

At step 430, the optimal data center is determined. In embodiments, this is accomplished by the AJAX code operating to compare the network speed measurements for each data center that were determined in step 425. The optimal data center may be deemed as the data center with the fastest network speed measurement (i.e., shortest time to download the dummy object).

At step 433, the identity of the optimal data center and the attributes of the user computing device are transmitted to the metrics server for storage in the performance database. In embodiments, this is accomplished by the AJAX code transmitting this data to the metrics server. In this manner, the determination of step 430 may be employed by future similarly situated computing devices.

At step 435, at least one link of the web page is modified to point to the optimal data center. In embodiments, the AJAX code modifies links as described above with respect to the alteration code and FIG. 2. In this manner, if the user selects (e.g., clicks on) one of these links, the data associated with the link (e.g., a new web page) will necessarily be downloaded from the optimal data center.

While the method of FIG. 4 has been described with respect to performance metrics (i.e., the use of a metrics server and performance database), it is noted that steps 415, 417, and 433 may be omitted from the process. That is, the invention may be implemented without an additional metrics server and performance database, whereby each user computing device is responsible for determining its own optimal data center for a host.

Figure 5:
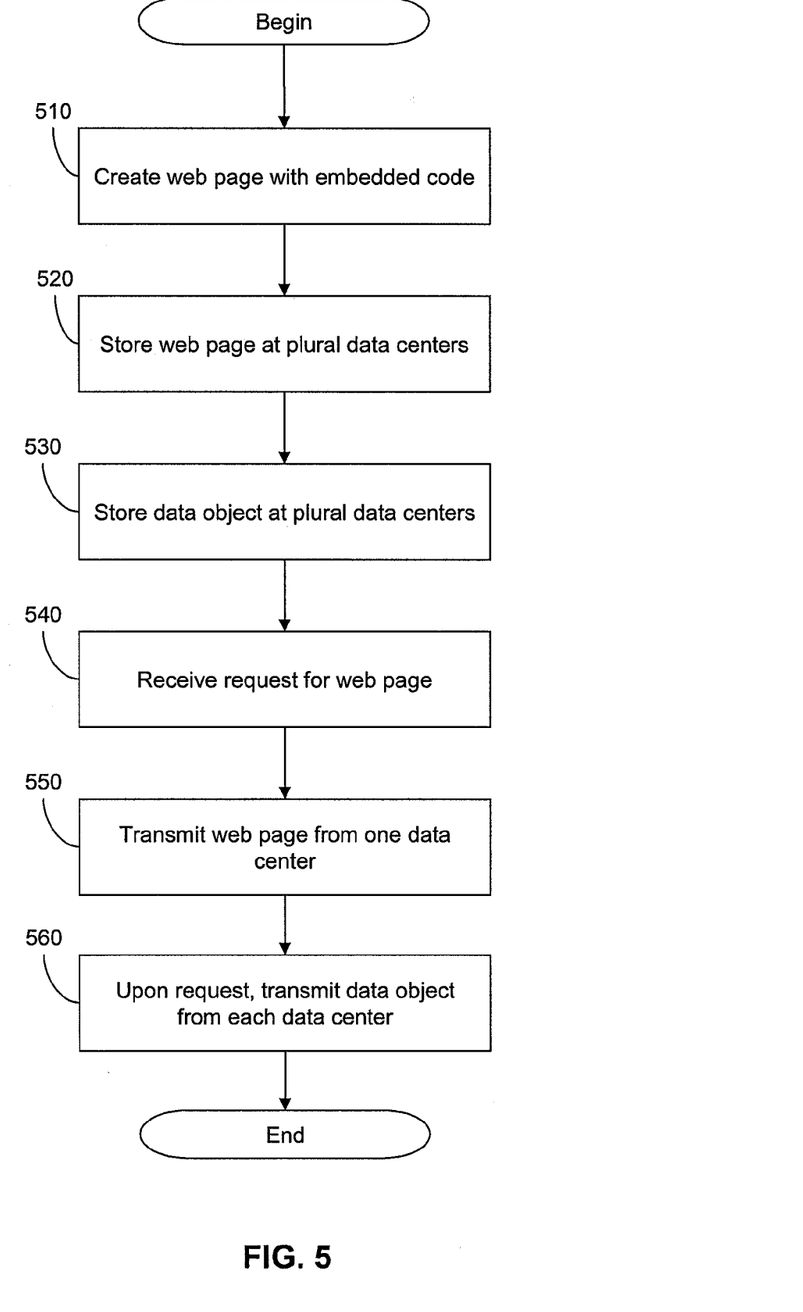

FIG. 5 shows a flow diagram depicting steps of a method for providing a web page that routes users to an optimal data center according to aspects of the invention. At step 510, a web page having embedded measurement code and alteration code is created. In embodiments, the web page may be created by a developer using AJAX code as described above with respect to FIG. 2.

At step 520, a copy of the web page is stored at each of a plurality of data centers of the host. This may be accomplished, for example, by storing the data of the web page at a server of each data center.

At step 530, at least one data object is stored at each of a plurality of data centers of the host. This may be accomplished, for example, by storing the data object at a server of each data center. The data object may be any suitable data object, such as that described with respect to FIG. 2.

At step 540, a request for the web page is received. In embodiments, the host receives a request for the web page from a user computing device via the Internet.

At step 550, the web page is transmitted. In embodiments, this is accomplished by transmitting the data of the web page, including the embedded code, to the user computing device via the Internet. It is not important which data center initially transmits the web page to the user, such that any known technique for choosing a data center for the initial transmission of the web page may be used with the invention.

At step 560, the data object is transmitted from each data center to the user computing device. In embodiments, each data center waits for a request for the data object from the user computing device. Upon receipt of the request, the data center transmits the data object to the user computing device via the Internet. In this manner, the user computing device may determine the network speed for each respective data center of the host.

While the invention has been described in terms of embodiments, those skilled in the art will recognize that the invention can be practiced with modifications and in the spirit and scope of the appended claims. For example, while the embodiments have been described with respect to a system and method, the invention may also be implemented in a toolkit and/or software package that allows webpage developers to enable the features described herein in their web pages.

What is claimed:

1. A method, comprising:
    transmitting a web page having measurement code and modification code from one of a plurality of data centers to a computing device, wherein the measurement code determines an optimal data center of the plurality of data centers for the computing device by asynchronously requesting download of a dummy object from each respective data center of the plurality of data centers and measuring a time to receive the dummy object from each respective data center to the computing device, and
    the modification code alters at least one link in the web page to point to the optimal data center, storing a first data object at each of the plurality of data centers; and
    storing a second data object, smaller in size than the first data object, at each of the plurality of data centers, wherein the measurement code: anticipates a type of data file that will be requested for download by the computing device, and requests either the first data object or the second data object based upon the anticipating.

2. The method of claim 1, further comprising transmitting the dummy object from each of the plurality of data centers to the computing device.

3. The method of claim 2, wherein the measurement code determines the optimal data center by comparing download times of the dummy object from each respective data center to the computing device.

4. The method of claim 1, wherein the measurement code determines the optimal data center asynchronously after the web page is downloaded at the computing device.

5. The method of claim 1, wherein the measurement code determines the optimal data center at predetermined time intervals after the web page is downloaded at the computing device.

6. The method of claim 1, wherein the measurement code makes a new determination of an updated optimal data center when a download speed from the optimal data center to the computing device drops below a predefined value.

7. The method of claim 1, further comprising storing historical data associated with a previous computing device and a previously determined optimal data center.

8. The method of claim 7, further comprising:
comparing attributes of the computing device to the historical data; and
based upon the comparing, transmitting identity information of the optimal data center to the computing device.

9. The method of claim 7, wherein the historical data comprises at least one of: network location data, geographic location data, and temporal performance data.

10. The method of claim 7, wherein the computing device is the previous computing device.

11. The method of claim 1, wherein the transmitting is provided by a service provider under a subscription and/or fee agreement and/or based on advertising content to one or more third parties.

12. The method of claim 1, wherein a service provider at least one of creates, maintains, deploys and supports a computer infrastructure that performs the transmitting.

13. A method of routing a user to an optimal data center, comprising:
providing a computer infrastructure operable to:
store copies of a web page having embedded measurement code and modification code at a plurality of data centers of a host; and
transmit the web page to a computing device, wherein the measurement code determines for the computing device an optimal data center of the plurality of data centers by asynchronously requesting download of a dummy object from each respective data center of the plurality of data centers and measuring a time to receive the dummy object from each respective data center to the computing device, and the modification code alters at least one link of the web page to constrain future downloads by the computing device from the host to occur from the optimal data center, storing a first data object at each of the plurality of data centers; and storing a second data object, smaller in size than the first data object, at each of the plurality of data centers, wherein the measurement code: anticipates a type of data file that will be requested for download by the computing device, and requests either the first data object or the second data object based upon the anticipating.

14. The method of claim 13, wherein the computer infrastructure is further operable to determine the optimal data center based upon historic data associated with at least one other computing device.

15. The method of claim 13, wherein the measurement code determines the optimal data center asynchronously after the web page is completely downloaded at the computing device.

16. The method of claim 13, wherein the measurement code determines the optimal data center at predetermined time intervals after the web page is downloaded at the computing device.

17. The method of claim 13, wherein the computer infrastructure is further operable to:
store historical data associated with a previous computing device and a previously determined optimal data center of the host;
compare attributes of the computing device to the historical data; and
based upon the comparing, transmit identity information of the optimal data center to the computing device.

18. The method of claim 13, wherein the computer infrastructure is created, maintained, deployed, or supported by a service provider.

19. A computer program product comprising a computer readable non-transitory storage medium having a computer readable program embodied in the medium, wherein the computer readable program when executed on a computing device is operable to cause the computing device to:
transmit a web page containing embedded measurement code and modification code from a data center of a plurality of data centers to a computing device across a network,
wherein the measurement code, upon completion of downloading of the web page at the computing device, determines for the computing device an optimal data center of the plurality of data centers by asynchronously requesting download of a dummy object from each respective data center of the plurality of data centers and measuring a time to receive the dummy object from each respective data center to the computing device, and
the modification code alters at least one link of the web page to point to the optimal data center such that data associated with selecting the at least one link is downloaded from the optimal data center, storing a first data object at each of the plurality of data centers; and storing a second data object, smaller in size than the first data object, at each of the plurality of data centers, wherein the measurement code: anticipates a type of data file that will be requested for download by the computing device, and requests either the first data object or the second data object based upon the anticipating.

20. The computer program product of claim 19, wherein the measurement code performs one of the following:
determines the optimal data center asynchronously after the web page is downloaded at the computing device, and
determines the optimal data center by querying a server having access to stored historical data associated with a previous computing device and a previously determined optimal data center.

21. A system, comprising:
a host including a plurality of data centers, each data center of the plurality of data centers storing a copy of a web page and being connected to a network that is accessible by a computing device, the web page comprising embedded network speed measurement code and link modification code; and
at least one of a hardware and software component configured to transmit the web page from one data center of the plurality of data centers to the computing device,
wherein the measurement code, upon completion of downloading of the web page at the computing device, determines for the computing device an optimal data center of the plurality of data centers by asynchronously requesting download of an object and measuring a time to receive the object from each respective data center to the computing device, and
the modification code alters at least one link of the web page to point to the optimal data center such that data associated with selecting the at least one link is constrained to be downloaded from the optimal data center, storing a first data object at each of the plurality of data centers; and storing a second data object, smaller in size than the first data object, at each of the plurality of data centers, wherein the measurement code: anticipates a type of data file that will be requested for download by the computing device, and requests either the first data object or the second data object based upon the anticipating.

22. The system of claim 21, wherein each data center of the plurality of data centers stores a copy of the object, the measurement code determines the optimal data center by comparing times to download the data object from each respective data center of the plurality of data centers to the computing device, and the measurement code determines the optimal data center asynchronously after the web page is downloaded at the computing device.

23. The system of claim 21, further comprising:
a database storing historical data associated with a previous computing device and a previously determined optimal data center; and
a server arranged to compare attributes of the computing device to the historical data, and, based upon the comparing, transmit identity information of the optimal data center to the computing device.

* * * * *